(12) United States Patent
Mata et al.

(10) Patent No.: US 9,574,279 B2
(45) Date of Patent: Feb. 21, 2017

(54) MODULARIZED ELECTROCHEMICAL CELL SYSTEM

(71) Applicant: The Boeing Company, Chicago, IL (US)

(72) Inventors: Marianne Mata, Dana Point, CA (US); Shailesh Atreya, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/543,011

(22) Filed: Nov. 17, 2014

(65) Prior Publication Data

US 2015/0072257 A1    Mar. 12, 2015

Related U.S. Application Data

(62) Division of application No. 12/706,250, filed on Feb. 16, 2010, now Pat. No. 8,889,306.

(51) Int. Cl.
*C25B 15/02* (2006.01)
*H01M 8/04* (2016.01)
*H01M 8/06* (2016.01)
*H01M 8/24* (2016.01)

(52) U.S. Cl.
CPC ............ *C25B 15/02* (2013.01); *H01M 8/0494* (2013.01); *H01M 8/04201* (2013.01); *H01M 8/04947* (2013.01); *H01M 8/04955* (2013.01); *H01M 8/0656* (2013.01); *H01M 8/249* (2013.01); *Y02E 60/50* (2013.01); *Y10T 29/49108* (2015.01); *Y10T 29/49117* (2015.01)

(58) Field of Classification Search
None
See application file for complete search history.

(56) References Cited

U.S. PATENT DOCUMENTS 5,069,985 A * 12/1991 Cohen ................. H01M 8/2415
429/434
2002/0058175 A1   5/2002 Ruhl
2004/0033398 A1 * 2/2004 Kearl et al. ..................... 429/22
(Continued)

FOREIGN PATENT DOCUMENTS

CN          1536730         10/2004
JP        2000188116         7/2000
(Continued)

OTHER PUBLICATIONS

PCT, International Search Report and Written Opinion, International Application No. PCT/US2011/020237, Apr. 1, 2011.
(Continued)

*Primary Examiner* — Monica Huson
(74) *Attorney, Agent, or Firm* — Thompson Hine LLP

(57) ABSTRACT

A method for assembling an electrochemical cell stack may include arranging a plurality of electrochemical cells into an electrochemical cell stack, the electrochemical cell stack including at least a first substack and a second substack; connecting the first substack and second substack such that reactant fluid flows in series from the first substack to the second substack; and coupling the first substack to a first electrical control device such that the first electrical control device selectively electrically reconfigures the first substack to operate in series and in parallel with the second substack.

20 Claims, 3 Drawing Sheets

(56) References Cited

U.S. PATENT DOCUMENTS

| | | | |
|---|---|---|---|
| 2004/0126641 A1 | 7/2004 | Pearson et al. | |
| 2005/0271917 A1 | 12/2005 | Hoffjann et al. | |
| 2006/0172176 A1 | 8/2006 | MacBain et al. | |
| 2006/0257696 A1 | 11/2006 | Sridhar et al. | |
| 2007/0287043 A1* | 12/2007 | Marsh et al. | 429/23 |
| 2009/0263681 A1 | 10/2009 | Atreya et al. | |
| 2009/0274937 A1 | 11/2009 | LaBreche et al. | |
| 2010/0261083 A1 | 10/2010 | Yanase et al. | |
| 2011/0039174 A1 | 2/2011 | Hatada | |

FOREIGN PATENT DOCUMENTS

| | | |
|---|---|---|
| JP | 2002231280 | 8/2002 |
| JP | 2004538600 | 12/2004 |
| JP | 2007294291 | 11/2007 |
| JP | 2009238599 | 10/2009 |
| WO | 2009/008229 | 1/2009 |

OTHER PUBLICATIONS

US, Notice of Allowance, U.S. Appl. No. 12/706,250, Jul. 16, 2014.
US, Office Action, U.S. Appl. No. 12/706,250, Jun. 23, 2014.
US, Advisory Action, U.S. Appl. No. 12/706,250, Jun. 6, 2013.
US, Advisory Action, U.S. Appl. No. 12/706,250, May 28, 2013.
US, Office Action, U.S. Appl. No. 12/706,250, Jan. 15, 2013.
US, Office Action, U.S. Appl. No. 12/706,250, Jun. 22, 2012.
JP, English translation of Notice of Reasons for Rejection; Japanese Patent Application No. 2012-553909 (Jun. 9, 2015).
CN, Third Office Action with English translation; Chinese Patent Application No. 201180009811.2 (Jul. 14, 2015).
EP, Examination Report, European Application No. 11700208.9, issued Mar. 15, 2016.

* cited by examiner

MODULARIZED ELECTROCHEMICAL CELL SYSTEM

FIELD

The present patent application relates to electrochemical cells, such as fuel cells and electrolysis cells, and, more particularly, to electrochemical cell stacks that have been modularized into substacks.

BACKGROUND

An electrochemical cell includes an anode, a cathode and an electrolyte. Reactants at the anode and cathode react and ions move across the electrolyte while electrons move through an external electrical circuit to form a completed electrochemical reaction across the cell.

An electrochemical cell can be designed to operate only as a fuel cell, where electrical power and heat are output from the electrochemical reaction with fuel and oxidizer as input reactants, or only as an electrolyzer, where input power and reactant (water), and possibly input heat, electrochemically react to produce hydrogen and oxygen, or as a dual purpose electrochemical cell capable of switching between fuel cell and electrolysis modes. Electrolyzer cells operate electrochemically in reverse with respect to fuel cells.

There are multiple types of electrochemical cells which can operate as fuel cells and/or electrolyzers. Some of the most common types of electrochemical fuel cells are proton exchange membranes, solid oxide, molten carbonite, alkaline, and phosphoric acid.

There are many geometries possible for individual electrochemical cells, the two most common types being planar cells and tubular cells. In planar cells the cathode, electrolyte and anode are layered in a planar geometry. In tubular cells the electrolyte is in a tubular configuration with either the anode on the inside of the tube and the cathode external or the cathode on the inside of the tube and the anode external.

Multiple individual electrochemical cells can be configured electrically in series to form a "stack" to match the voltage, power, and current needed for the desired application. For planar electrochemical cell technology, the individual cells are stacked on top of each other with fluid separation plates in between and mechanically fastened together to form the stack of cells electrochemically in series. For tubular electrochemical cell technology, the individual tubes are bundled together with the reactant flow usually shared between the tube inputs and electrical connections at the external outside and ends of the tubes.

Historically, the stack shares a single reactant flow input and output path. The number of cells in the electrochemical cell stack may be selected to provide the cell stack with the desired voltage, current, and power output/input range in response to reactants (i.e., fuel and oxidizer such as hydrogen and oxygen in fuel cell operation, or water and heat in electrolysis operation) passing through the stack.

Stacks may be arranged electrically in parallel or in series with other stacks to support larger power applications. Historically, stacks or subportions of stacks are hardwired electrically into a set configuration.

Historically, when an electrochemical cell stack is supporting a power or load profile (load on a fuel cell or input power to an electrolyzer) that is changing, the entire stack is controlled as a single unit sharing equal load or power production supported by a shared reactant stream. All the cells in the stack historically are designed to operate at the same current density (amperes passing through a set electrochemical cell surface area) to support the power or load profile.

An electrochemical cell operates along a performance curve, commonly called a polarization curve, inherent to each cell. The performance curve dictates how the electrochemical cell voltage changes with the change in current flowing through it.

FIG. 1 is an example proton exchange cell performance or polarization curve operating in fuel cell mode. FIG. 2 is the same example proton exchange cell performance or polarization curve operating in electrolyzer mode. FIG. 3 is an example solid oxide cell performance or polarization curve operating in electrolyzer mode.

In accordance with the electrochemical cell's polarization curve, voltage varies with the change of current density which corresponds to different power levels (input and output).

In a regenerative electrochemical cell's polarization curve, voltage can vary even more significantly between operation in fuel cell and electrolysis mode (reference FIGS. 1 and 2). This difference is compounded as the amount of cells in a stack increase. Thus, a power distribution and control system supporting a single electrochemical cell stack which operates in both fuel cell and electrolysis mode must accommodate a wider range of voltages associated with the electrochemical cell stack.

Historically, to overcome the voltage differences between fuel cell and electrolysis mode in a regenerative electrochemical cell stack, power converters have been used to either boost the output voltage or reduce the input voltage. However, power converters create an efficiency loss, add weight, increase system complexity, and present reliability issues. Another option is to use two separate stacks, one for the fuel cell mode and one for the electrolysis mode. However, additional fuel cell stacks increase the overall weight of the application, present the need for thermal control of the non-operating stack, and introduce reliability issues due to the need for valves that switch between the two modes.

It is with respect to these considerations and others that the disclosure made herein is presented.

SUMMARY

In one embodiment, a method for assembling an electrochemical cell stack may include arranging a plurality of electrochemical cells into an electrochemical cell stack, the electrochemical cell stack including at least a first substack and a second substack; connecting the first substack and second substack such that reactant fluid flows in series from the first substack to the second substack; and coupling the first substack to a first electrical control device such that the first electrical control device selectively electrically reconfigures the first substack to operate in series and in parallel with the second substack.

In another embodiment, a method of operating an electrochemical cell system may include connecting at least two electrochemical cell stacks, each of the electrochemical cell stacks including a plurality of electrochemical cells arranged into a plurality of substacks; electrically coupling each substack of one of the electrochemical cell stacks with at least one substack of the other of the electrochemical cell stacks to define at least a first and a second row of substacks; electrically coupling at least two electrical control devices to the first and second rows of substacks, respectively; and selectively and independently electrically reconfiguring the first and second rows of substacks to operate in series and in parallel with at least each other.

In yet another embodiment, a method for regulating voltage and power output of an electrochemical cell system to a load may include arranging a plurality of electrochemical cells of the electrochemical cell system into an electrochemical cell stack, the electrochemical cell stack including at least a first substack and a second substack; coupling the first substack to an electrical switch that selectively electrically reconfigures the first substack to operate in series and in parallel with the second substack; and actuating the switch to regulate the voltage and the power output of the electrochemical cell system by either electrically coupling or decoupling one or more of the substacks from the load, or modifying the electrical configuration of the substacks between a parallel configuration and a series configuration.

Other aspects of the disclosed modularized electrochemical cell system will become apparent from the following description, the accompanying drawings and the appended claims.

DETAILED DESCRIPTION

Figure 4:
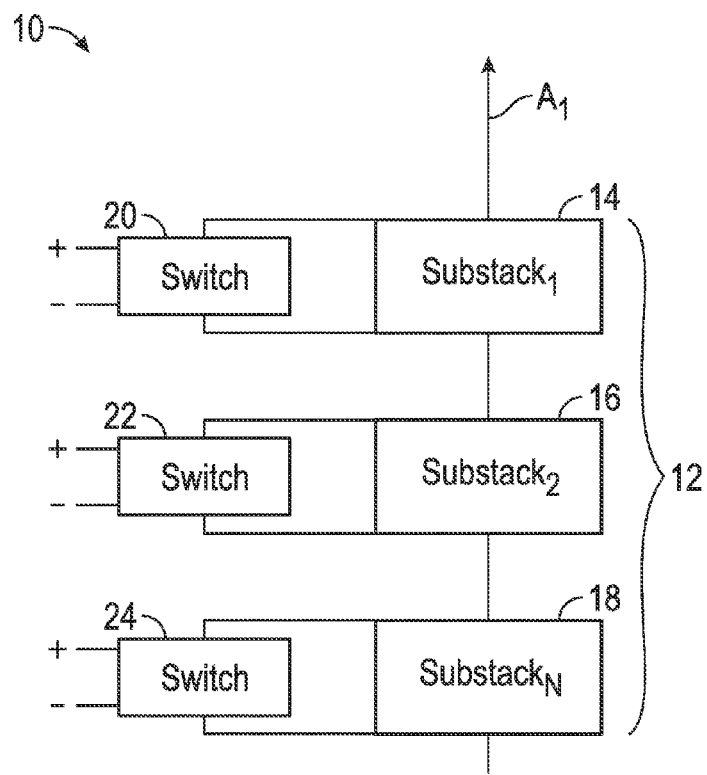
FIG. 4 is a schematic view of one aspect of the disclosed modularized electrochemical cell system.

The present disclosure provides for modularization of electrochemical cell stacks, such as fuel cell stacks, electrolysis cell stacks, while the substacks' electrical configuration, such as electrical operation in parallel, series, open circuit, or a combination thereof, is able to be modified individually or in groups by means of electrical control devices, such as switches or relays, to support changes in system power or performance, as shown in FIG. 4. It is believed that such a configuration provides reliable switching of the electrochemical substacks such that the overall system can more simply support a wider range of voltage and power inputs and outputs, providing higher performance and system control in both fuel cell and/or electrolyzer modes. This modularization configuration can also provide a more controlled or stable electrochemical cell operation by allowing the individual cells to operate over a smaller performance or current density range, while at the same time matching wider system voltages and power input/outputs.

A modularized electrochemical cell stack can provides additional thermal benefit for the stack when the reactant flow is in series from substack to substack, rather than in parallel among substacks. Although reactant flow in parallel through the electrochemical cells in the stack has minimal negative effects when the substacks remain operating in a similar manner, as when the substacks' electrical configuration is changed from series to parallel, it would result in increased unutilized reactant flowing through the system when a substack is placed in an open circuit configuration. The unutilized reactant flow from the non-operating substack would pass through the system and result in either additional system efficiency loss or increased system hardware needed to process or recycle the additional unutilized reactant.

Another aspect of this disclosure is to design the electrochemical cell stack such that the reactant flows in series from substack to substack. This configuration of a modularized electrochemical cell stack has the advantage of still maintaining a single stack input for flow control while allowing the maximum amount of reactant to be utilized in the stack. The reactant flow in series from substack to substack configuration also allows for waste heat from electrochemical reactions in upstream substacks to maintain the desired thermal environment for any non-operating substacks downstream, reducing or eliminating the need for thermal control hardware. It should be understood that the reactant flow through the electrochemical cells within the substack could be in parallel, series, or a combination of both internal to the substack.

Figure 5:
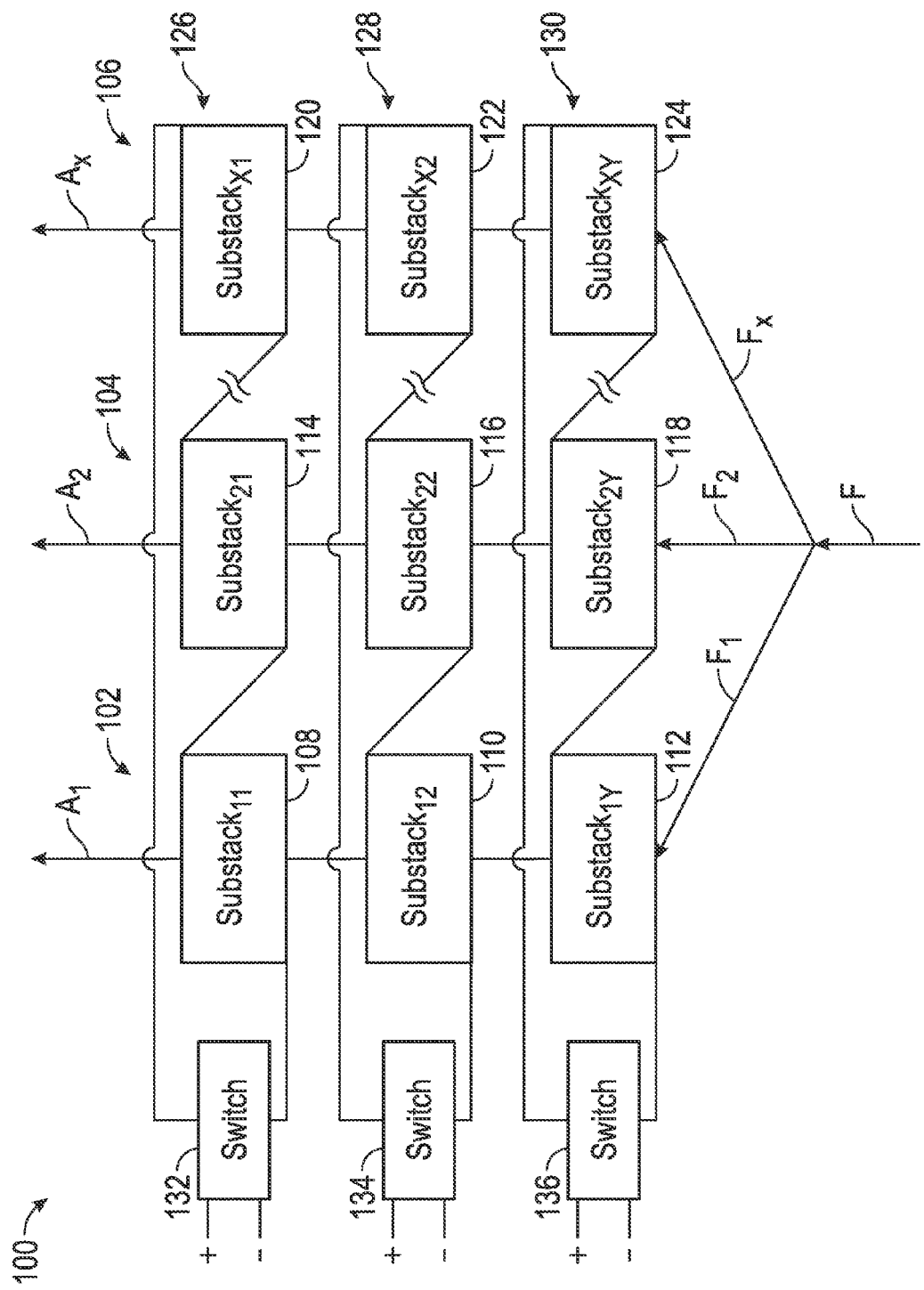
FIG. 5 is a schematic view of another aspect of the disclosed modularized electrochemical cell system.

The disclosed modularized electrochemical stack design may assist in operation of systems with a plurality of stacks. In such a system, reactant flow can be controlled from a single source and then flow is diverted equally to the plurality of stacks. The plurality of stacks may be modularized into individual controllable substacks, or by groups of substacks across plural stacks, as shown in FIG. 5. A multiple stack system which employs the modularized system can allow simplified more reliable matching of power inputs or outputs without shutting down an entire stack and associated reactant flow. A modularized stack allows instantaneous electrochemical cell deactivation of part of the stack, while allowing other sections of the stack to operate, which can eliminate or greatly reduce the need for additional thermal control of the non-operating cells. Fluid reactant flow can be controlled at a simplified number of points with the flow diverted passively to the plurality of stacks. This allows the mechanical control hardware to be simplified and further removed from possible high temperature electrochemical cells, resulting in lower cost and more reliable hardware, as well as a simple and more reliable system.

The disclosed modularized electrochemical stack design may assist in operation of regenerative electrochemical cell stacks that function in both fuel cell and electrolyzer modes. In such a system, the configuration of substacks operating in series and in parallel can be modified by means of the electrical control devices to match the desired voltage range.

Figure 1:
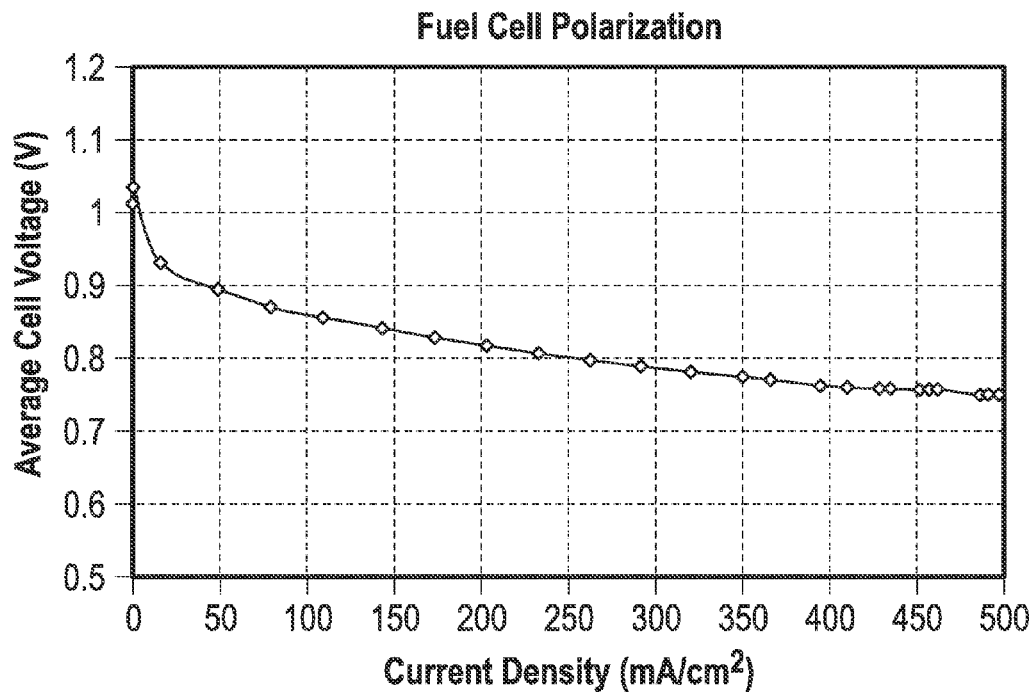
FIG. 1 is a graphical illustration of average cell voltage versus current density of an example proton exchange cell operating in fuel cell mode, wherein the data for the curve was originally published in NASA document NASA/TM-2006-214054 "Round Trip Energy Efficiency of NASA Glenn Regenerative Fuel Cell System", by Garcia, Chang, Johnson, Bents, Scullin, and Jakupca.
Figure 2:
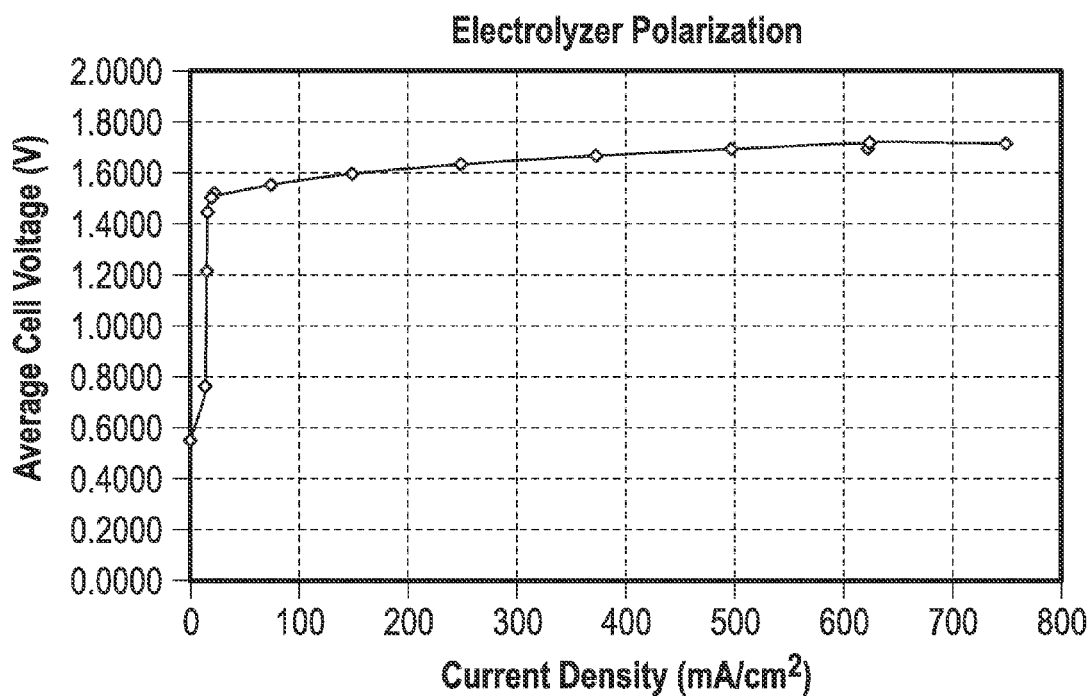
FIG. 2 is a graphical illustration of average cell voltage versus current density of the same example proton exchange cell operating in electrolyzer mode.
Figure 3:
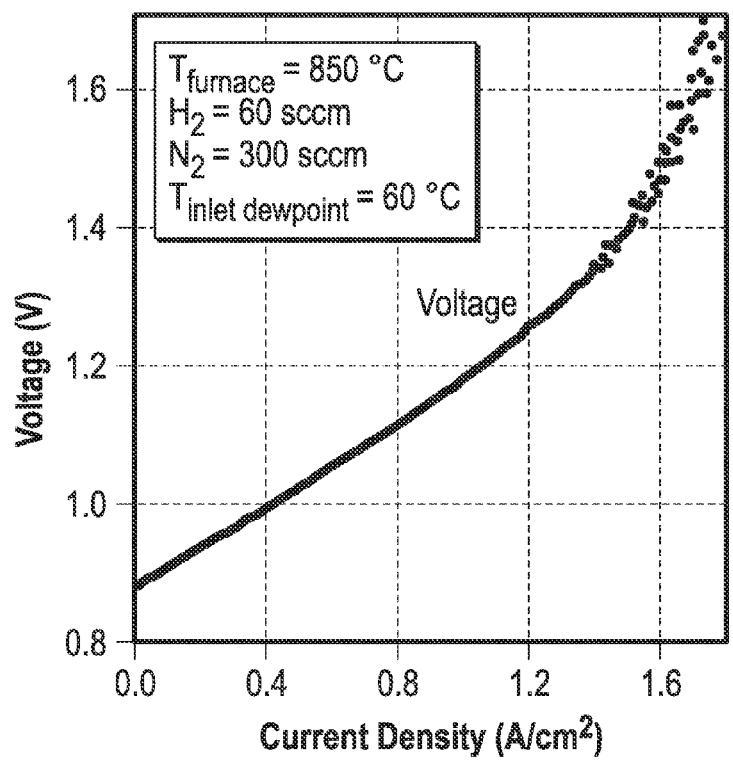
FIG. 3 is a graphical illustration of voltage versus current density of an example solid oxide cell operation in electrolysis mode, wherein the curve was originally published by Dr. Steve Herring at Idaho National Laboratory, May 19, 2009 as part of the "High Temperature Electrolysis System" presentation (project ID# PD_14_Herring) for the U.S. Department of Energy Hydrogen Program.

The advantages of the disclosed modularized system is illustrated in the example of a regenerative fuel cell/electrolyzer system. An example regenerative proton exchange membrane electrochemical stack has a total of 34 cells divided into two substacks of 17 cells electrically in series. As evident in the comparison of FIGS. 1 and 2, the voltage of an electrochemical cell can vary significantly at different current operation points, which correspond to different power input and output levels. Using the example performance shown in FIGS. 1 and 2, operation in fuel cell mode at 300 A/cm2, each cell would be operating at approximately 0.78V, resulting in a total substack voltage of 13.3V. The same individual cells operating in electrolysis mode at 300 A/cm2 would be operating at approximately 1.64V, bringing the total substack voltage to 27.9V. By allowing the substacks to be electrically reconfigured by an electrical control device between fuel cell and electrolysis operation, one could configure the substacks in series in fuel cell mode and in parallel in electrolysis mode, resulting in an operating voltage of 26.5V in fuel cell mode and 27.8V in electrolysis mode.

However, in a traditional configuration, all 34 cells would be electrically "hardwired" in series with no electrical reconfiguration possible. With the same amount of cells (same power out) the traditional configuration of a single stack of 34 electrochemical cells in series would result in an operating voltage change from 26.5V in fuel cell mode versus 55.8V in electrolysis mode. In this example, the power distribution system for a modularized configuration would have to accommodate a voltage range of 27.8V to 26.5V (a difference of only 1.3V), which is within the standard design range of a 28V system per MIL-STD-704. In this example, the traditional stack configuration would be forced to design for a significantly wider voltage range of 26.5V to 55.8V, which is well outside standard voltage ranges, and therefore implement a more complex power distribution system design such as utilizing power converters, with their associated weight and efficiency loss, to keep the system voltage in a more manageable range. Whereas in a modularized configuration the smaller voltage difference allows a simpler power distribution system design within standard voltage ranges without additional power conversion or other associated equipment.

In another simplified example of the system, a group of electrolyzer stacks could be supporting a variable power input profile, such as input from a solar power source for generating hydrogen. The solar profile changes throughout the day as the sun rises, moves across the sky, and sets, resulting in a very large change in power input. In a traditional solid oxide stack configuration, entire stacks would be either turned off as the solar power decreases, resulting in more complex thermal control systems to keep the non-operating stacks hot.

Using a modularized configuration, a single substack of each stack could be operated at daybreak and dusk, to produce a smaller amount of power at a more stable solid oxide cell operational range, while producing heat to thermally maintain the non-operating substacks. The amount of operational substacks in each stack could be increased by means of the electrical control devices, and the reactant flow to the stacks could be increased by means of the single (or reduced number of) fluid flow control points to support the increased solar power available throughout the day while still maintaining a tighter current density operational range and therefore less impact to the balance of plant hardware, system design, and controls.

As shown in FIG. 4, one aspect of the disclosed modularized electrochemical cell system, generally designated 10, may include an electrochemical cell stack 12 comprised of a number of electrochemical cells, wherein the electrochemical cell stack 12 may be subdivided into a number N of substacks 14, 16, 18. The substacks 14, 16, 18 may be electrically coupled in series.

Electrical control devices 20, 22, 24 (e.g., switches) may be electrically coupled to each substack 14, 16, 18 such that each associated substack 14, 16, 18 may be electrically reconfigured to a load or power source to operate in parallel or in series with the other remaining substacks. The electrical control devices 20, 22, 24 coupled to each associated substack 14, 16, 18 can also electrically decouple the substack from the load/source as desired.

The number of electrochemical cells and electrical configuration of the cells comprising the electrochemical cell stack 12 may be selected based upon the type of electrochemical cell used and the desired output of the stack 12 (e.g., peak power output), among other factors. In one aspect, the electrochemical cells of the stack 12 may be fuel cells, such as solid oxide fuel cells. In another aspect, the electrochemical cells of the stack 12 may be electrolysis cells, which may be the same or similar to fuel cells. In yet another aspect, the electrochemical cells of the stack 12 may operate as both fuel cells and electrolysis cells.

The number N of substacks 14, 16, 18 in the electrochemical cell stack 12 may be dictated by the total number of electrochemical cells in the stack 12, the desired operational cell performance range, the surrounding system voltage requirements, as well as by other considerations. For example, the number N of substacks 14, 16, 18 may be dictated by cost considerations that limit the total number of electrical switches 20, 22, 24 in the system 10.

The number and electrical configuration of electrochemical cells in each substack 14, 16, 18 may be dictated by the total number of electrochemical cells in the stack 12, the type of electrochemical cells being used, the desired output of the system 10, as well as other considerations.

For example, a solid oxide cell stack operating as a fuel cell having 51 total electrochemical cells may be divided into three substacks, wherein each substack has an associated electrical control device, and wherein each substack includes 17 individual electrochemical cells fixed in series. However, it should be understood that these numbers are only exemplary, and that each substack of the system may have a different number of cells as compared to the other substacks of the system, as well as a different fixed electrical configuration of those cells.

Thus, fluid (e.g., fuel cell or electrolyzer reactants) may flow from substack 18 to substacks 16 to substack 14 in series, as shown by arrow A, while each substack 14, 16, 18 may be electrically coupled to the load in parallel by way of the associated electrical control devices 20, 22, 24. Furthermore, the voltage and power output of the system 10 may be varied by either electrically coupling or decoupling one or more of the substacks 14, 16, 18 from the load, or modifying the electrical configuration of the substacks from parallel to series by way of the associated electrical switches 20, 22, 24.

Referring to FIG. 5, another aspect of the disclosed modularized electrochemical cell system, generally designated 100, may include X number of electrochemical cell stacks 102, 104, 106, each comprised of a number of electrochemical cells. The electrochemical cells of each electrochemical cell stack 102, 104, 106 may be subdivided into Y number of substacks 108, 110, 112, 114, 116, 118, 120, 122, 124. It should be understood that different electrochemical cell stacks 102, 104, 106 may have a different number Y of substacks 108, 110, 112, 114, 116, 118, 120, 122, 124. It should be understood that different electrochemical cell substacks 108, 110, 112, 114, 116, 118, 120, 122, 124 may have a different number of electrochemical cells and cell electrical configurations within the substacks.

At least two substacks 108, 110, 112, 114, 116, 118, 120, 122, 124 from each electrochemical cell stack 102, 104, 106 may be electrically coupled together in series to form a number of rows 126, 128, 130 of substacks. For example, row 126 may include substack 108 from electrochemical cell stack 102, substack 114 from electrochemical cell stack 104 and substack 120 from electrochemical cell stack 106, row 128 may include substack 110 from electrochemical cell stack 102, substack 116 from electrochemical cell stack 104 and substack 122 from electrochemical cell stack 106, and row 130 may include substack 112 from electrochemical cell stack 102, substack 118 from electrochemical cell stack 104 and substack 124 from electrochemical cell stack 106. As used herein, the word "row" broadly refers to the electrical coupling, in series, of substacks across multiple electrochemical cell stacks 102, 104, 106 and is not intended to limit the rows 126, 128, 130 to any particular spatial arrangement or alignment.

An electrical control device 132, 134, 136 (e.g., a switch) may be electrically coupled to each row 126, 128, 130 such that the associated row 126, 128, 130 may be selectively electrically coupled to a load/source in parallel or series with the other rows 126, 128, 130, or selectively electrically decoupled from the load vis-à-vis the other rows 126, 128, 130 as desired.

For example, a fuel cell system may include three stacks of solid oxide fuel cells, each stack having 51 total individual cells, which may be divided into three substacks, wherein each substack includes 17 individual cells electrically coupled in series. One substack from each stack may be electrically coupled, in series, to form three rows of substacks, wherein each row of substacks includes an associated electrical control device.

Thus, an incoming fluid stream F may be divided into multiple incoming streams $F_1$, $F_2$, $F_X$, each of which may flow through an electrochemical cell stack 102, 104, 106 by flowing through the associated substacks in series (e.g., 112, 110 and 108; 118, 116 and 114; 124, 122 and 120) as shown by arrows $A_1$, $A_2$, $A_X$, while each row 126, 128, 130 of substacks may be electrically coupled to the load in parallel. The division of the incoming fluid stream F into equal or non-equal flows may be established through design of the stacks and substacks themselves, without relying on active components. Furthermore, the power input or power output of the system 100, based on fuel cell operation or electrolyzer operation, may be varied by either electrically coupling or decoupling one or more of the rows 126, 128, 130 of substacks 108, 110, 112, 114, 116, 118, 120, 122, 124 from the load by way of the associated electrical switches 132, 134, 136. The voltage input or voltage output of the system 100, based on fuel cell operation or electrolyzer operation, may also be varied by modifying the electrical configuration of the rows 126, 128, 130 from parallel to series operation by way of the associated electrical control devices 132, 134, 136.

Accordingly, the disclosed modularized electrochemical cell systems, including systems 10 and 100, provide for electrical switching of substacks while maintaining a single fluid flow control point. The fluid flow through the substacks in series allows for more efficient operation over a larger power range because the fluid flow can be controlled from a single source based on the number of substacks operating. In current designs, whole electrochemical cell stacks are deactivated resulting in the need for fluid control hardware to individually isolate the stack (increasing complexity and decreasing reliability) or if the stack is not individually isolated, the unreacted fluid flows through the stack which decreases efficiency of the system. Thus, the disclosed modularized system can reduce the need for mechanical switches (e.g., valves), and potentially eliminate the need for higher temperature mechanical switches, for controlling fluid flow, which are generally more expensive, bulky and less reliable than electrical switches.

Accordingly, the disclosed modularized electrochemical cell systems may provide for grouping of substacks in multiple configurations across some or all of the "rows" and stacks. The various substacks or groupings of substacks can not only be activated and deactivated, but also modified to operate electrically in series or parallel, or groupings of series and parallel by means of the electrical control devices. Therefore, the substacks may be electrically coupled to the load in various ways for multiple power profiles depending on whether the system is in fuel cell mode or electrolysis mode, without the need for power converters.

For example, the system could operate in electrolysis mode with only certain rows of substacks (120, 122, 124) switched on initially, and turning on multiple rows as the input power increases, thereby allowing the system to support a wide swing in input power while still operating efficiently. The system efficiency may be increased by avoiding efficiency losses associated with deactivating and maintaining thermal control of entire stacks or loss of reactants through non-operating stacks.

The ability to use a single fluid flow may facilitate keeping all of the electrochemical cells in the system warm even when a particular cell or row of cells is in deactivated mode, without the need for separate fluid flow controls. The ability to keep an off-mode cell warm may be particularly useful when the cells are temperature sensitive or require substantial warm-up time to achieve efficient operation, such as solid oxide fuel cells.

The systems 10, 100 and methods described herein provide for the modularization of an electrochemical cell to support more efficient and simplified operations for fuel cell operation, electrolyzer operation, or a regenerative cell operation. In another aspect, the disclosed electrochemical cell system 10, 100 may include a plurality of electrochemical cells arranged in an electrochemical cell stack 12, the stack including a plurality of substacks 14, 16, 18 configured such that fluid flows in series from substack to substack, a first electrical control device 20 coupled to a first substack 14 and a second electrical control device 22 coupled to a second substack 16, wherein the first electrical control device is controllable independently of the second control device to selectively configure the first and second substacks.

In another aspect, the disclosed electrochemical cell system 10, 100 may include multiple electrical cells arranged into a stack 102, where the stack is divided into at least two substacks 108, 110, 112. The cells in the substacks 108-112 would be electrically connected in series but the electrical configuration of each substack with the rest of the substacks would be controlled via a switch, relay or similar electrical control device 132, 134, 136. All the substacks 108-112 in the stack could share the same reactant input flow $F_1$, which could be controlled by a single source. Each substack 108-112 or group of substacks in the stack 102 could be electrically switched on or off (i.e., opening or completing the circuit to not allow or allow electron flow) by control of the electrical control device 132. Thus in this manner, some substacks could be switched off while other substacks in the stack 102 remain operating while at the same time adjusting the single reactant control point to select proper operational points for the electrochemical cells.

A modularized electrochemical cell stack 102, 104, 106 as such could support a wider range of output or input power while maintaining a more stable operational voltage and cell performance range. The operating substack(s) configuration could be easily be cycled to allow thermal control of the whole stack 102-106, either by having cells upstream provide waste heat to the downstream cells or rotating substack operation so cells do not cool down. The electrochemical stack modularization also could allow, by means of the electrical control devices 132, 134, 136, the instantaneous electrical reconfiguration of substacks or multiple substacks between electrical operation in parallel or series, or a combination of the two, in order to match a desired total voltage and power profile for a load or a power source more closely. A more stable voltage performance range, achieved either by modifying the number of operating substacks or by reconfiguring the substacks electrically between series and parallel, may eliminate the need for power regulation hardware and the weight and efficiency losses associated with it.

The disclosed electrochemical cell system 100 may include at least two electrochemical cell stacks 102-106, each of the stacks including a plurality of electrochemical cells arranged into a plurality of substacks 108-124 such that fluid flows in series from substack to substack, wherein each substack of one of the stacks is electrically coupled in series with at least one substack of the other stacks to define at least two rows of substacks, and at least two electrical control devices 132-136, each of the electrical control devices being electrically coupled to an associated one of the rows of substacks 126-130.

The disclosed electrochemical cell system 100 may include at least two electrochemical cell stacks 102-106, with each electrochemical cell stack including a plurality of electrochemical cells arranged into at least two substacks 108-124. The electrochemical cells in the substacks could be in an electrically fixed configuration, such as in series, in parallel, or in a combination of both, but the electrical configuration of an individual substack, or group of substacks, with the remaining system substacks could be controlled via a switch, relay, or similar electrical control device 132, 134, 136. Each stack 102-106 could operate with a shared reactant flow in series from substack to substack. The plurality of stacks also could operate with a shared reactant flow in parallel with other stacks so as to allow uniform flow to the stacks with a single fluid flow control point. In a multiple stack configuration, the electrical configuration of substacks or substack groups among multiple stacks could be switched in series or in parallel, or activated or deactivated as required to support the electrochemical cell thermally and specifically support the desired power attributes and performance ranges of the application.

In one particular aspect, the disclosed systems 10, 100 may be used in combination with another energy system, wherein an alternative input power source (e.g., solar power) is used to run the system in electrolysis mode when the alternative input power is available (e.g., during daylight hours) to produce hydrogen, which in turn is used to fuel the system in fuel cell mode when the alternative power is not available (e.g., at night). The disclosed systems may operate such total energy storage systems at a higher efficiency and higher reliability due to the ability to respond quickly and efficiently to variable inputs (e.g., fluctuations in incoming solar energy).

Although various aspects of the disclosed modularized electrochemical cell system have been shown and described, modifications may occur to those skilled in the art upon reading the specification. The present application includes such modifications and is limited only by the scope of the claims.

What is claimed is:

1. A method for assembling an electrochemical cell stack, the method comprising:
   electrically connecting a plurality of electrochemical cells into a plurality of electrochemical cell stacks, including at least a first electrochemical cell stack having at least a first substack and a second substack of electrochemical cells, and a second electrochemical cell stack having a first substack and a second substack of electrochemical cells; and
   electrically coupling the plurality of electrochemical cell stacks together such that the first substack of the first electrochemical cell stack and the first substack of the second electrochemical cell stack form a first row of substacks across the first and the second electrochemical cell stacks;
   including electrically coupling at least the first substack of the first electrochemical cell stack to the first substack of the second electrochemical cell substack and to a first electrical control device such that the first electrical control device selectively electrically configures the first substack of the first electrochemical cell stack to operate electrically in series and in parallel with the first substack of the second electrochemical cell stack.

2. The method of claim 1, further comprising dividing a stream of reactant fluid into multiple incoming streams to the plurality of stacks to flow in series through substacks of each of the plurality of electrochemical cell stacks.

3. A method for assembling an electrochemical cell stack, the method comprising:
   arranging a plurality of electrochemical cells into a plurality of electrochemical cell stacks, including a first electrochemical cell stack having at least a first substack and a second substack of electrochemical cells, and a second electrochemical cell stack having at least a first substack and a second substack of electrochemical cells;
   electrically coupling the plurality of electrochemical cell stacks together, including electrically coupling the first substack of the first electrochemical cell stack to the first substack of the second electrochemical cell stack to form a first row of substacks across at least the first and the second electrochemical cell stacks, and eletrically coupling the second substack of the first electrochemical cell stack to the second substack of the second electrochemical cell stack to form a second row of subtracks across at least the first and the second electrochemical cell stacks;
   coupling the first substack of the first electrochemical cell stack and the first substack of the second electrochemical cell stack to a first electrical control device such that the first electrical control device selectively electrically configures the first substack of the first electrochemical cell stack and the first substack of the second electrochemical cell stack to operate in series and in parallel; and
   coupling the second substack of the first electrochemical cell stack and the second substack of the second electrochemical cell stack to a second electrical control device to selectively electrically configure the second substack of the first electrochemical cell stack and the second substack of the second electrochemical cell stack to operate in series and in parallel, wherein the first electrical control device is controllable independently of the second electrical control device to selectively electrically configure the first and the second rows of substacks.

4. The method of claim 3, wherein coupling the first substack to a first electrical control device, and coupling the second substack to the second electrical control device includes coupling the first electrical control device to selectively couple and decouple the first substack to a load or a power source, and coupling the second electrical control device to selectively couple and decouple the second substack to the load or the power source.

5. The method of claim 3, wherein coupling the first substack to a first electrical control device, and coupling the second substack to the second electrical control device includes coupling the first and second electrical control devices to selectively electrically couple the first and the second substacks in series.

6. The system of claim 3, wherein coupling the first substack to a first electrical control device, and coupling the second substack to the second electrical control device includes coupling the first and second electrical control devices to selectively electrically couple the first and second substacks in parallel.

7. The method of claim 1, wherein providing a plurality of electrochemical cells includes providing a plurality of electrochemical cells selected from fuel cells and electrolyzer cells.

8. The method of claim 1, further comprising connecting the first substack and second substack such that reactant fluid flows in series from the first substack to the second substack of at least the first stack electrochemical cells.

9. A method for assembling an electrochemical cell stack, the method comprising:
    arranging a plurality of electrochemical cells into a plurality of electrochemical cell stacks, at least one of the plurality of the electrochemical cell stacks having at least a first substack and a second substack of electrochemical cells;
    electrically coupling the plurality of electrochemical cell stacks together;
    coupling at least the first substack to a first electrical control device such that the first electrical control device selectively electrically reconfigures the first substack to operate in series and in parallel with the second substack of the at least one of the plurality of electrochemical cell stacks; and
    selectively operating the electrochemical cells of the plurality of electrochemical cells in both a fuel cell mode and an electrolyzer mode.

10. A method for assembling an electrochemical cell stack, the method comprising:
    arranging a plurality of electrochemical cells into a plurality of electrochemical cell stacks, including a first electrochemical cell stack having at least a first substack and a second substack of electrochemical cells, and a second electrochemical cell stack having at least a first substack and a second substack of electrochemical cells;
    electrically coupling the plurality of electrochemical cell stacks together;
    electrically coupling at least the first substack of the first electrochemical cell stack and the first substack of the second electrochemical cell stack to a first electrical control device to form a first row of substacks across the first and the second electrochemical cell stacks such that the first electrical control device selectively electrically configures the first substack of the first electrochemical cell stack to operate in series and in parallel with the first substack of the second electrochemical cell stack; and wherein arranging the plurality of electrochemical cells includes arranging a plurality of electrochemical cells selected from polymer exchange membrane cells and solid oxide fuel cells.

11. A method for assembling an electrochemical cell stack, the method comprising:
    arranging a plurality of electrochemical cells into a plurality of electrochemical cell stacks, including a first electrochemical cell stack hacing at least a first substack and a second substack of electrochemical cells, and a second electrochemical cell stack having at least a first substack and a second substack of electrochemical cells;
    electrically coupling the plurality of electrochemical cell stacks together;
    coupling at least the first substack to a first electrical control device such that the first electrical control device selectively electrically reconfigures the first substack to operate in series and in parallel with the second substack of the at least one of the plurality of electrochemical cell stacks; and
    controlling fluid flow in series between the substacks of the first and the second electrochemical cell stacks at a single flow control point.

12. The method of claim 11, further comprising electrically coupling the first substack of the first electrochemical cell stack with the first substack of the second electrochemical cell stack; and electrically coupling the second substack of the first electrochemical cell stack with the second substack of the second electrochemical cell stack.

13. The method of claim 12, further comprising coupling the second substack of the first electrochemical cell stack to a second electrical control device to selectively electrically reconfigure the second substack to operate in series and in parallel with substacks of other electrochemical cell stacks of the plurality of substacks; and wherein coupling the first substack and coupling the second substack includes coupling the first and second electrical control devices to selectively electrically configure the first and the second substacks of the electrochemical cell stack and the second electrochemical cell stack in a selected one of a series configuration, a parallel configuration, and a disconnected configuration.

14. A method of operating an electrochemical cell system, the method comprising:
    electrically coupling in series a first substack of a first electrochemical cell stack with a first substack of a second electrochemical cell stack to form a first row of substacks across the first and the second electrochemical cell stacks;
    electrically coupling an electrical control device to the first row of substacks; and
    selectively and independently electrically reconfiguring the first row of substacks with the electrical control device to alternately couple and decouple the first row from a load.

15. The method of claim 14, further comprising causing reactant fluid to flow in series from substack to substack in each of the plurality of substacks, wherein the fluid is selected from fuel cell reactant and electrolyzer reactant.

16. A method for regulating voltage and power output of an electrochemical cell system to a load, the method comprising:
    arranging a plurality of electrochemical cells of the electrochemical cell system into a first electrochemical cell stack and a second electrochemical cell stack, the first and the second electrochemical cell stacks each including at least a first substack and a second substack;
electrically coupling the first substack of the first electrochemical cell stack to the first substack of the second electrochemical cell stack to form a first row of substacks across the first and the second electrochemical cell stacks;
electrically coupling the first row of substacks to a first electrical switch that selectively electrically couples and decouples the first row of substacks to the load; and
actuating the first electrical switch to regulate the voltage and the power output of the electrochemical cell system by one of electrically coupling first row of substacks to or decoupling the first row of substacks from the load.

17. The method of claim 16, further comprising connecting the first substack and the second substack such that reactant fluid flows in series through the first electrochemical cell stack and in series through the second electrochemical cell stack.

18. The method of claim 17, further comprising operating the electrochemical cell system in electrolysis mode by initially switching on only certain rows of substacks; and then turning on multiple rows of substacks as input power increases, thereby allowing the electrochemical cell system to support a wide swing in input power while still operating efficiently.

19. The method of claim 16, further comprising:
electrically coupling the second substack of the first electrochemical cell stack to the second substack of the second electrochemical cell stack to form a second row of substacks across the first and the second electrochemical cell stacks;
electrically coupling the second row of substacks to a second electrical switch that selectively electrically reconfigures the second substack to operate in series and in parallel with the first substack; and
actuating the first and the second electrical switches to regulate the voltage and the power output of the electrochemical cell system by modifying the electrical configuration of the first row of substacks and second row of substacks to the load between a parallel configuration and a series configuration.

20. The method of claim 3, wherein coupling the first substack to the first electrical control device, and coupling the second substack to the second electrical control device includes coupling the first substack and the second substack of the first and the second stacks of electrochemical cells, wherein at least one of the first substack and the second substack is selectively reconfigurable independently of the other remaining substacks of the plurality of substacks by the first electrical control device and the second electrical control device, respectively.

* * * * *

UNITED STATES PATENT AND TRADEMARK OFFICE
CERTIFICATE OF CORRECTION

PATENT NO. : 9,574,279 B2
APPLICATION NO. : 14/543011
DATED : February 21, 2017
INVENTOR(S) : Marianne Mata et al.

It is certified that error appears in the above-identified patent and that said Letters Patent is hereby corrected as shown below:

In the Claims

Claim 11, Column 12, Line 9 reads:
"electrochemical cell stack hacing at least a first substack"

It should read:
--electrochemical cell stack having at least a first substack--

Signed and Sealed this
Eleventh Day of April, 2017

Michelle K. Lee
*Director of the United States Patent and Trademark Office*